United States Patent [19]

Pertle

[11] Patent Number: 4,614,136

[45] Date of Patent: Sep. 30, 1986

[54] ANGULARLY ADJUSTABLE MANDREL ASSEMBLY

[75] Inventor: John E. Pertle, Garden Valley, Calif.

[73] Assignee: Tri-Tool, Rancho Cordova, Calif.

[21] Appl. No.: 674,921

[22] Filed: Nov. 26, 1984

[51] Int. Cl.⁴ .............................................. B23B 3/22
[52] U.S. Cl. ......................................... 82/44; 82/4 C
[58] Field of Search ........................ 82/4 R, 4 C, 44; 279/2 R

[56] References Cited

U.S. PATENT DOCUMENTS

| | | |
|---|---|---|
| 1,869,780 | 8/1932 | Rosener . |
| 2,436,152 | 2/1948 | Richards .............................. 82/4 R |
| 2,478,310 | 8/1949 | Payne . |
| 3,822,837 | 7/1974 | Celebonovic . |
| 3,871,670 | 3/1975 | Wright . |
| 4,245,529 | 1/1981 | Astle ................................... 82/4 C |
| 4,246,814 | 1/1981 | Pertle .................................. 82/4 C |
| 4,257,289 | 3/1981 | Groothius . |
| 4,493,232 | 1/1985 | Nall ..................................... 82/4 C |

Primary Examiner—Francis S. Husar
Assistant Examiner—Jerry Kearns
Attorney, Agent, or Firm—Bacon & Thomas

[57] ABSTRACT

A mandrel assembly is disclosed for use in a portable lathe apparatus for machining the end face of a hollow workpiece. The mandrel supports an orbiting cutting tool which machines the end face and defines a cutting plane. The angle of the longitudinal axis of the mandrel and, consequently the cutting plane which is perpendicular thereto, is angularly adjustable with respect to the central axis of the workpiece. This enables the formation of a miter cut on the end of the workpiece. Complimentary hemispherical surfaces having common centers located at the juncture of the cutting plane and the central axis of the workpiece allow the mandrel to be angularly adjusted in any direction.

24 Claims, 8 Drawing Figures

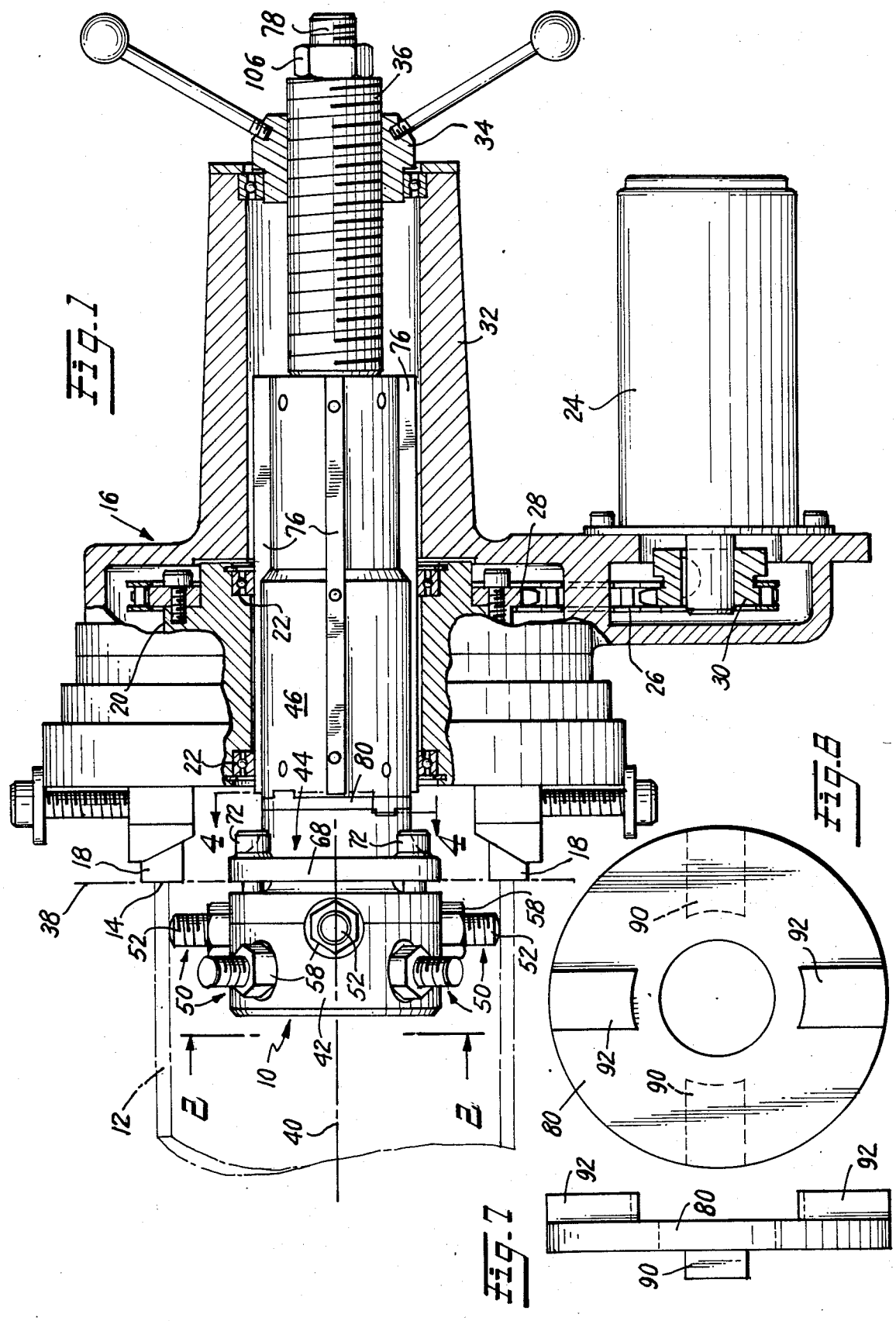

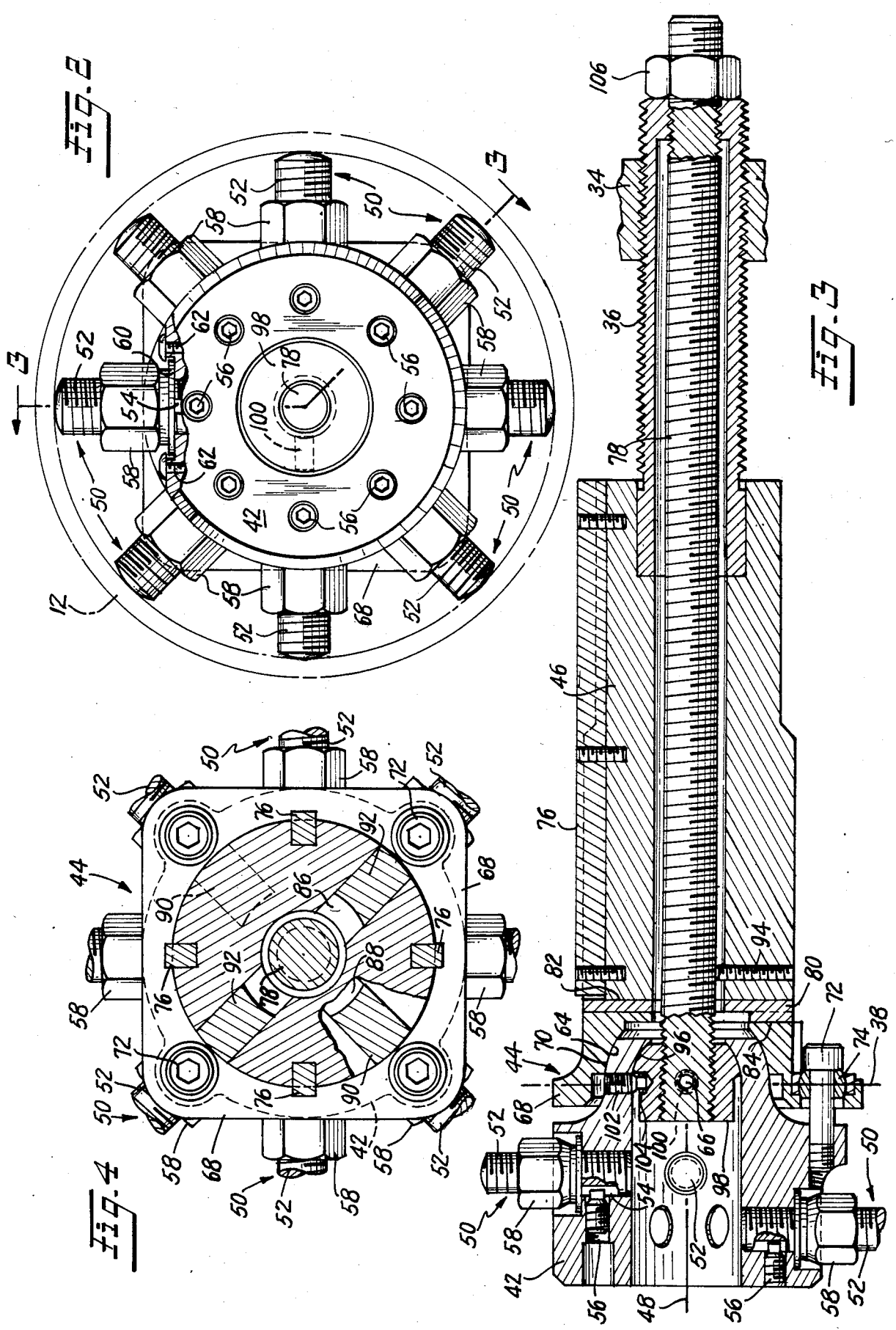

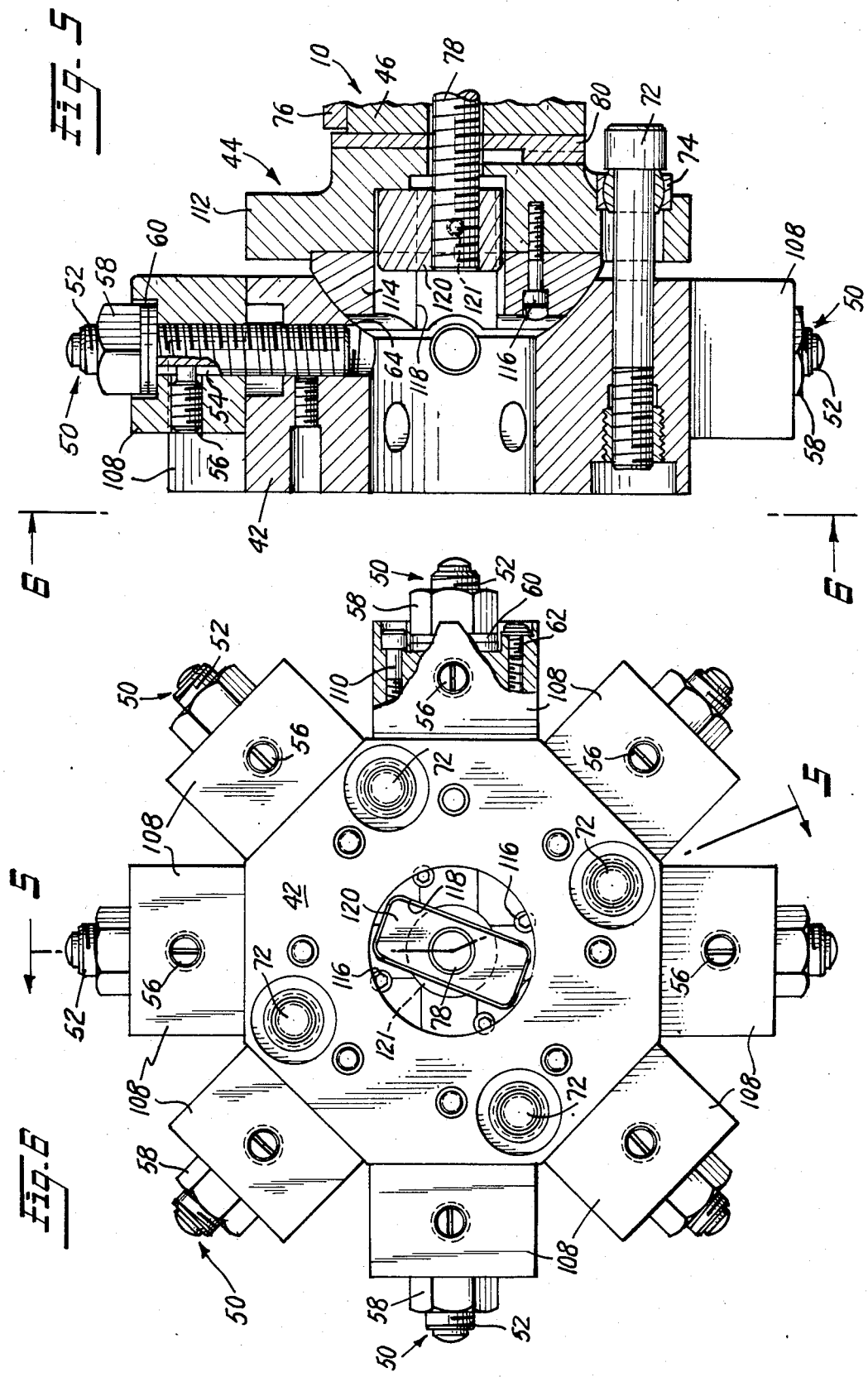

ANGULARLY ADJUSTABLE MANDREL ASSEMBLY

BACKGROUND OF THE INVENTION

1. Field of the Invention.

The instant invention relates to a mandrel assembly for rotatably supporting an orbiting cutting tool adjacent to the end of a hollow workpiece, such as a pipe or tube. The cutting plane, defined by the rotating cutting tool, is adjustable with respect to the central axis of the workpiece to enable the workpiece to be cut at an angle.

2. Brief Description of the Prior Art.

Many types of portable lathes have been developed over the years to machine the end of a hollow workpiece such as a pipe or tube. It is necessary to accurately machine and sometimes bevel the end face of the pipes or tubes in order to enable them to be welded together. Typically, these portable lathes comprise a mounting base having means thereon to be attached to the pipe, a mandrel rigidly attached to the mounting base, a cutting tool mechanism rotatably supported by the mandrel such that a cutting tool orbits about the longitudinal axis of the mandrel, and means to feed the cutting tool into the end face of the pipe. Mounting bases may either be internal, wherein it is attached to the inner surface of the pipe, or external wherein it is attached to the outer periphery of the pipe.

It is also known to provide adjustment means between the mounting base and the mandrel to enable the longitudinal axis of the mandrel to be adjusted with respect to the mounting base in order to accurately align this longitudinal axis with the central axis of the pipe. This enables the cutting tool to accurately machine the end face of the pipe to be perpendicular to the central axis of the pipe.

In some instances, however, it may be necessary to machine the end face of the pipe such that its plane is not perpendicular to the central axis. This is often necessary when assembling pipe lines in the field, since the pipe sections meant to be affixed together may be misaligned. In these instances, the mitering of the end face of the pipes is the only practical way to achieve a leak-proof joint between them.

It has been proposed to provide a portable lathe with a mandrel having the capability of adjusting the angle of the cutting plane with respect to the central axis of the workpiece to thereby miter the end of the workpiece in U.S. Ser. No. 406,540 to Nall et al. filed on Aug. 9, 1982 and entitled "Adjustable Mandrel For Supporting Tubular Workpieces". In this device, however, the angular adjustment of the mandrel with respect to the mounting base is limited to a single plane containing the longitudinal axis of the mounting base. While this device has proven successful, there remains a need for a portable lathe apparatus which will permit the angular adjustment of the mandrel with respect to the mounting base in any direction.

SUMMARY OF THE INVENTION

The instant invention provides such a mandrel assembly for a portable lathe wherein the mandrel may be angularly adjusted with respect to the mounting base in any direction. The mounting base is of the internal type and contains a plurality of radially expandible securing legs which grip the interior of the pipe. The mounting base defines a first hemispherical surface which is in contact with a corresponding, second hemispherical surface defined by a mounting bracket structure. The mandrel for rotatably supporting the cutting mechanism is attached to the mounting bracket structure.

The term "hemispherical surface" as used in this invention is defined as any segment of a spherical surface and is not intended to be specifically limited to one-half of a sphere.

Attachment means provided between the mounting bracket structure and the mounting base allow it and the mandrel to be angularly adjusted with respect to the mounting base. The centers of the first and second hemispherical surfaces are coincident and lie on the central axis of the workpiece. The cutting plane defined by the rotation of the cutting tool also passes through the central axis of the workpiece at the center of the hemispherical surfaces.

In a preferred embodiment, a draw bar passes through a longitudinal opening in the mandrel and has retaining means on either end so as to retain the mandrel in contact with the mounting bracket structure. A coupling plate is provided between the end face of the mandrel and an end face of the mounting bracket structure which permits lateral adjustment of the mandrel with respect to the mounting bracket structure via set screws passing through the mandrel and bearing against the draw bar. This permits the mandrel, and consequently the cutting tool, to be accurately aligned with the central axis of the workpiece.

BRIEF DESCRIPTION OF THE DRAWINGS

FIG. 1 is a side view, partially broken away, of the mandrel assembly according to the invention mounted in the workpiece and rotatably supporting a cutting tool mechanism.

FIG. 2 is an end view, taken along line 2—2 in FIG. 1, partially broken away, of the mandrel assembly according to the invention.

FIG. 3 is a side sectional view taken along line 3—3 in FIG. 2.

FIG. 4 is a sectional view taken along lines 4—4 in FIG. 1.

FIG. 5 is a partial side sectional view of a second embodiment of the mandrel assembly according to the invention.

FIG. 6 is a front view, taken along lines 6—6 in FIG. 5, of the mandrel assembly according to the invention.

FIG. 7 is a side view of the coupling plate utilized with the embodiments of the mandrel assembly according to the invention.

FIG. 8 is an end view of the coupling plate shown in FIG. 7.

DETAILED DESCRIPTION OF THE PREFERRED EMBODIMENTS

The mandrel assembly according to the invention is generally shown at 10 in FIG. 1 mounted within a hollow workpiece 12, such as a pipe or a tube, adjacent an end 14, which is to be machined. The mandrel assembly 10 supports a rotating cutting tool assembly 16 thereon. The tool assembly 16 generally comprises a plurality of cutting tool bits 18 supported on rotatable housing 20 which is slidably supported on the mandrel assembly 10 via bearings 22. Rotatable housing 20 is driven from motor 24, which may be either electric, pneumatic or hydraulic, by the interengagement of endless chain 26 with sprocket wheels 28 and 30 attached to the rotatable housing and the motor shaft, respectively. Motor 24 is mounted to stationary housing 32 which is also supported by the mandrel assembly 10. Manual feed handle 34 is threadingly engaged with threaded shaft 36 attached to the mandrel assembly 10. As can be seen, rotation of feed assembly 34 with respect to threaded shaft 36 causes the rotating cutting tool 16 to move toward the end 14 of pipe 12, thus bringing cutting bits 18 into contact therewith. The cutting tools bits 18 machine the end 14 along a cutting plane 38 defined by the cutting edges of tool bits 18 as they rotate about the central axis 40 of the mandrel assembly. Although a description of the construction of the cutting tool assembly has been provided for the purposes of providing an adequate disclosure of this invention, it should be understood that this specific contruction forms no part of the instant invention. Such cutting tool assemblies are well known in the art and any such assembly could be utilized without exceeding the scope of this invention.

As shown in FIG. 3, the mandrel assembly 10 comprises a mounting base 42, a mounting bracket structure 44 and mandrel 46. Mounting base 42, with central axis 48, has a plurality of radially expanding securing legs 50 which may be expanded in a radial direction in order to mount the structure within the pipe 12. Each of the securing legs 50 comprises a threaded stud 52 disposed within a radial bore through the mounting base 42. Each of the threaded studs 52 defines a longitudinally extending groove 54 along one side into which is inserted an end of set screw 56 threadingly engaged with the mounting base 42. The interengagement of the set screw 56 with the longitudinal groove 54 of threaded stud 52 prevents the rotation of stud 52 with respect to the mounting base 42. Nut member 58 is threadingly engaged with the external threads on the stud 52 and has a flange portion 60 adjacent one end. As best seen in FIG. 2, flange 60 engages the head portions of screws 62 inserted into the mounting base 42 so as to prevent the nut members 58 from moving in a radial direction with respect to the mounting base 42. As can readily be seen, manual rotation of nut members 58 causes the outer most end of the threaded stud 52 to move in a radial direction in order to grip the interior of pipe 12 and to accurately locate the center line 48 of the mounting base 42 coincident with the central axis 40 of pipe 12. Although eight securing legs 50 are shown extending from the mounting base 42, quite obviously other numbers of such securing legs may be utilized without exceeding the scope of this invention.

Mounting base 42 defines a first hemispherical surface 64 having its center at 66 located on the central axis 48. Center 66 is located at the juncture of the central axis 48 and the cutting plane 38 as shown.

Mounting bracket structure 44 comprises a mounting bracket 68 having a hemispherical surface 70 in contact with hemispherical surface 64. Mounting bracket 68 is attached to mounting base 42 via bolts 72 which pass through spherical bearings 74 and threadingly engage the mounting base 42. Spherical bearings 74 permit the mounting bracket 68 to be angularly adjusted with respect to the mounting base 42 without inducing significant transverse stress in bolts 72. The angle may be adjusted by selectively tightening or loosening mounting bolts 72 at one or more of the four attachment points, shown in FIG. 4.

Hemispherical surface 70 is complimentary to hemispherical surface 64 such that their centers are coincident and located at 66, the juncture of cutting plane 38 and central axis 48.

Mandrel 46 has longitudinally extending bars 76 attached thereto which engage corresponding flanges on the stationary cutting tool housing 32 in order to prevent relative rotation therebetween. Threaded shaft 36 is fixedly attached to one end of mandrel 46.

Draw bar 78 extends through the threaded shaft 36, the mandrel 46 and the mounting bracket 68 in order to retain an endface of the mandrel 46 in contact with a face of the mounting bracket 68. A coupling plate 80 is interposed between end face 82 of mandrel 46 and end face 84 of mounting bracket 68. End face 82 defines a transversely extending groove 86 extending in a first direction across the face. End face 84 also defines a transverse groove 88 which extends across face 84, but in a direction approximately at right angles to the direction of transverse groove 86.

As shown in FIGS. 7 and 8, coupling plate 80 has a first pair of lugs 90 extending from a first face thereof such that these lugs slidably engage transverse groove 84. A second pair of transverse lugs 92 extend from a second face of the coupling plate 80 such that they are slidably engaged with transverse groove 86. The purpose of including coupling plate 80 between the mounting bracket 68 and the mandrel 46 is to prevent the relative rotation of these elements while at the same time allowing the lateral adjustment of the mandrel 46 with respect to the mounting bracket 68. This is accomplished by manual adjustment of set screws 94, which extend generally parallel to transverse groove 86 on diametrically opposite sides of the mandrel 46. As can be seen in FIG. 3, the inner end of set screws 94 bear against draw bar 78 which permits lateral adjustment in one direction by loosening one pair of set screws and tightening the diametrically opposite pair of set screws 94. Similar set screw adjusting means are provided through mandrel 46 extending generally parallel to groove 88. Thus, by adjusting the orthogonally disposed set screws, the lateral position of the mandrel may be adjusted with respect to the mounting bracket structure.

In the embodiment shown in FIG. 3, mounting base 42 also defines a third hemispherical surface 96 which also has its center located at 66. Retaining nut 98 is attached to an end of draw bar 78 and has a pin 100, or the like, extending transversely through both elements to prevent their relative rotation. Nut 98 also has a hemispherical surface in contact with the hemispherical surface 96 formed on mounting base 42. Set screw 102 is threadingly engaged with the mounting base 42 and has an end portion which extends into opening 104 formed on the exterior surface of nut 98. The interengagement of set screw 102 with nut 98 prevents relative rotation between mounting bracket 42 and nut 98.

Retaining nut 106 is threadingly engaged with an opposite end of draw bar 78 such that it bears against an end of threaded shaft 36. When retaining nut 106 is tightened against the end of shaft 36 the mandrel assembly is retained in its position. If retaining nut 106 is loosened, bolts 72 may be selectively loosened or tightened which will adjust the angle of the axis of mandrel 46 and mounting bracket structure 44 with respect to the central axis 48 of the mounting base 42. The mounting bracket structure and, consequently, the mandrel 46 will pivot about the center 66 of the hemispherical surfaces to adjust the angle of the cutting plane 38 with respect to the central axis 48. Since this central axis is generally coincident with central axis of pipe 12, the adjustment of the cutting plane 38 will enable the end of the pipe to be cut with the desired miter angle. The assembly is locked in the adjusted position by tightening retaining nut 106.

The embodiment shown in FIGS. 5 and 6 functions in a manner identical to that previously described, but is utilized in pipes or tubes having larger interior diameters. Common elements have been assigned the same identifying numbers as in the previously discussed embodiment. As can be seen, spacer blocks 108 are attached to the outer periphery of mounting base 42 via bolts 110 or the like. Securing leg members 50 extend through the spacer blocks and into the mounting base 42. Set screws 56 may be inserted through threaded openings in spacer blocks 108 so as to engage the longitudinal grooves 54 of threaded studs 52. Nut members 58 having radial flanges 60, are retained in the spacer blocks 108 by screws 62 such that they may rotate, but are prohibited from undergoing radial movement. Since threaded studs are prohibited from rotating about their longitudinal axes, rotation of nut members 58 will cause the threaded stud members to move in a radial direction in order to grip the interior of pipe 12.

The mounting bracket structure of this embodiment is formed by a first portion 112 which defines transverse groove 88 facing the mandrel, and a second portion 114 defining second hemispherical surface 70. Bolts 116 secure the first and second portions together. First and second portions 112 and 114 define laterally recessed portion 118 into which extends retaining member 120 secured to an end of draw bar 78. Means, such as pin 121 extend through retaining member 120 and draw bar 78 to prevent relative rotation of these elements. The engagement of retaining member 120 with the lateral recessed portions 118 serves to prevent rotation of the draw bar 78 with respect to the mounting bracket structure 44.

The attachment of mandrel 46 to the mounting bracket structure 44 and the remainder of the mandrel structure is exactly the same as described in relation to the previous embodiment. The adjustment of the angle of the mandrel with respect to the mounting base is also achieved in the same manner as in the previous embodiment.

The foregoing descriptions are provided for illustrative purposes only and should not be construed as in any way limiting this invention, the scope of which is solely defined by the appended claims.

What is claimed is:

1. A mandrel assembly for rotatably supporting a cutting tool against an end of a hollow workpiece such that the angle of a cutting plane, defined by the orbiting cutting tool, is universally adjustable with respect to a central axis of the workpiece comprising:
   (a) mandrel means for rotatably supporting the cutting tool such that a cutting edge of the tool orbits about the mandrel means defining a cutting plane extending generally perpendicular to a longitudinal axis of the mandrel means;
   (b) a mounting base having a central axis and a first hemispherical surface, the center of the first hemispherical surface lying on the central axis of the mounting base;
   (c) radially extendable securing leg means attached to the mounting base for securing the mounting base within a hollow workpiece having a central axis such that the central axis of the mounting base is generally coincident with the central axis of such hollow workpiece;
   (d) a mounting bracket structure having a second hemispherical surface complimentary to the first hemispherical surface;
   (e) first attachment means attaching the mounting bracket structure to the mounting base such that the first and second hemispherical surfaces are in contact with each other and the center of the second hemispherical surface coincides with the center of the first hemispherical surface;
   (f) second attachment means attaching the mandrel means to the mounting bracket structure such that the cutting plane always passes through the center of the first and second hemispherical surface; and
   (g) coupling means interposed between an end of the mandrel means and the mounting bracket structure to permit the lateral movement of the mandrel means with respect to the mounting bracket structure while prohibiting relative rotation therebetween, the coupling means comprising:
      (i) a first anti-rotation means associated with the mounting bracket structure;
      (ii) a second anti-rotation means associated with the mandrel means; and,
      (iii) a coupling means extending between the mounting bracket structure and the mandrel means, the coupling having at least a third anti-rotation means cooperating with said first and second anti-rotation means in such a manner that said mounting bracket structure and mandrel means can move laterally relative to each other but cannot rotate relative to each other.

2. The mandrel assembly of claim 1 wherein the radially extendable securing leg means comprises:
   (a) a plurality of studs attached to the mounting base and extending in a radial direction such that an external portion extends radially beyond the outer surface of the mounting base;
   (b) a plurality of nut members, one nut member threadingly engaged with each stud;
   (c) first retaining means retaining each nut on the mounting base such that it may rotate, but not move in a radial direction; and,
   (d) second retaining means attached to the mounting base and engaging each stud to prevent rotation of the studs with respect to the mounting base.

3. The mandrel assembly of claim 2 wherein each of the studs define a longitudinally extending slot and the second retaining means comprises a plurality of set screws threadingly engaged with the mounting base, each set screw having to prevent its rotation with respect to the mounting base.

4. The mandrel assembly of claim 3 comprising:
   (a) a flange on the mounting bracket structure extending generally perpendicular to the longitudinal axis of the mandrel means;
   (b) a plurality of hollow spherical bearings attached to the second flange; and,
   (c) a plurality of adjusting screw means extending through the spherical bearings and threadingly engaging the first flange.

5. The mandrel assembly of claim 4 wherein the mandrel means defines a longitudinal opening extending therethrough and the second attachment means comprises:
   (a) a draw bar extending through the mandrel opening and the mounting bracket structure;

(b) first retaining means on a first end of the draw bar which extends through the mounting bracket structure; and, (c) second retaining means on a second end of the draw bar which extends from the mandrel means.

6. The mandrel assembly of claim 5 wherein the first hemispherical surface is concave and the second hemispherical surface is convex.

7. The mandrel assembly of claim 6 wherein the mounting bracket comprises:

(a) a first portion defining the first transverse groove;
(b) a second portion defining the second hemispherical surface; and,
(c) means to removably attach the second portion to the first portion.

8. The mandrel assembly of claim 5 wherein the first hemispherical surface is convex and the second hemispherical surface is concave.

9. The mandrel assembly of claim 8 wherein the mounting base further defines a third hemispherical surface, the third hemispherical surface also being concave and having its center coincident with the center of the first and second hemispherical surfaces.

10. The mandrel assembly of claim 9 wherein the radius of the third hemispherical surface is less than the radius of the first hemispherical surface.

11. The mandrel assembly of claim 10 wherein the draw bar is externally threaded adjacent the first and second ends and the first retaining means comprises: (a) a first nut threadingly engaged with the first end of the draw bar and, (b) means to prevent relative rotation of the first nut with respect to the draw bar.

12. The mandrel assembly of claim 11 wherein the second retaining means on the second end of the draw bar comprises a second nut threadingly engaged with the second end of the draw bar.

13. The mandrel assembly of claim 12 wherein the first nut has a hemispherical outer surface in contact with the third hemispherical surface on the mounting base.

14. The mandrel assembly of claim 13 further comprising antirotation means interconnecting the first nut with the mounting base to prevent relative rotation therebetween.

15. The mandrel assembly of claim 1 comprising:

(a) a flange on the mounting bracket structure extending generally perpendicular to the longitudinal axis of the mandrel means;
(b) a plurality of hollow spherical bearings attached to the second flange; and,
(c) a plurality of adjusting screw means extending through the spherical bearings and threadingly engaging the first flange.

16. The mandrel assembly of claim 1 wherein the mandrel means defines a longitudinal opening extending therethrough and the second attachment means comprises:

(a) a draw bar extending through the mandrel opening and the mounting bracket structure;
(b) first retaining means on a first end of the draw bar which extends through the mounting bracket structure; and,
(c) second retaining means on a second end of the draw bar which extends from the mandrel means.

17. The mandrel assembly of claim 1 wherein the first hemispherical surface is concave and the second hemispherical surface is convex.

18. The mandrel assembly of claim 17 wherein the mounting bracket comprises:

(a) a first portion defining the first transverse groove;
(b) a second portion defining the second hemispherical surface; and,
(c) means to removably attach the second portion to the first portion.

19. The mandrel assembly of claim 1 wherein the first hemispherical surface is convex and the second hemispherical surface is concave.

20. The mandrel assembly of claim 19 wherein the mounting base further defines a third hemispherical surface, the third hemispherical surface also being concave and having its center coincident with the center of the first and second hemispherical surfaces.

21. The mandrel assembly of claim 20 wehrein the radius of the third hemispherical surface is less than the radius of the first hemispherical surface.

22. The mandrel assembly of claim 20 wherein the draw bar is externally threaded adjacent first and second ends and the first retaining means comprises:

(a) a first nut threadingly engaged with the first end of the draw bar; the first nut having a hemispherical outer surface in contact with the third hemispherical surface of the mounting base;
(b) first antirotation means to prevent relative rotation between the first nut and the draw bar; and,
(c) second antirotation means to prevent relative rotation between the mounting base and the first nut.

23. The mandrel assembly of claim 4 wherein the mounting bracket structure and the coupling means comprises:

(a) a mounting bracket having the second hemispherical surface in contact with the first hemispherical surface of the mounting base, the mounting bracket defining a first transverse groove extending in a first direction across a face oriented toward the mandrel means;
(b) a second transverse groove defined in a face of the mandrel means oriented toward the mounting bracket, the second transverse groove extending in a second direction approximately at 90° to the first direction;
(c) a coupling plate disposed between the mounting bracket and the mandrel means, the coupling plate having a first pair of transversely aligned legs extending from a first face so as to slidably engage the first transverse groove, and a second pair of transversely aligned legs extending from a second face so as to slidably engage the second transverse groove;
(d) first adjusting screw means threadingly engaged with the mandrel means and extending in a radial direction generally parallel to the first transverse groove such that an inner end contacts the draw bar; and,
(e) second adjusting screw means threadingly engaged with the mandrel means and extending in a radial direction generally parallel to the second transverse groove such that an inner end contacts the draw bar.

24. The mandrel assembly of claim 1 wherein the mounting bracket structure and the coupling means comprises:

(a) a mounting bracket having the second hemispherical surface in contact with the first hemispherical surface in contact with the first hemispherical surface of the mounting base, the mounting bracket defining a first transverse groove extending in a first direction across a face oriented toward the mandrel means;

(b) a second transverse groove defined in a face of the mandrel means oriented toward the mounting bracket, the second transverse groove extending in a second direction approximately at 90° to the first direction;

(c) a coupling plate disposed between the mounting bracket and the mandrel means, the coupling plate having a first pair of transversely aligned legs extending from a first face so as to slidably engage the first transverse groove, and a second pair of transversely aligned legs extending from a second face so as to slidably engage the second transverse groove;

(d) first adjusting screw means threadingly engaged with the mandrel means and extending in a radial direction generally parallel to the transverse groove such that an inner end contacts the draw bar; and, (e) second adjusting screw means threadingly engaged with the mandrel means and extending in a radial direction generally parallel to the second transverse groove such that an inner end contacts the draw bar.

* * * * *